(12) United States Patent
Vitito

(10) Patent No.: US 7,604,273 B2
(45) Date of Patent: Oct. 20, 2009

(54) VEHICLE ENTERTAINMENT SYSTEM

(76) Inventor: Christopher J. Vitito, 514 Longmeadow St., Celebration, FL (US) 34747

( * ) Notice: Subject to any disclaimer, the term of this patent is extended or adjusted under 35 U.S.C. 154(b) by 796 days.

(21) Appl. No.: 11/177,405

(22) Filed: Jul. 11, 2005

(65) Prior Publication Data

US 2006/0119151 A1    Jun. 8, 2006

Related U.S. Application Data

(60) Provisional application No. 60/690,874, filed on Jun. 16, 2005.

(51) Int. Cl.
*B60N 99/08* (2006.01)
(52) U.S. Cl. .................. 296/37.8; 248/917; 348/837
(58) Field of Classification Search .............. 296/37.8; 224/311; 248/917, 918, 919, 920, 921, 922, 248/923
See application file for complete search history.

(56) References Cited

U.S. PATENT DOCUMENTS

| | | |
|---|---|---|
| 4,635,110 A | 1/1987 | Weinblatt |
| 4,690,362 A | 9/1987 | Helgeland |
| 5,161,766 A | 11/1992 | Arima |
| 5,436,792 A | 7/1995 | Leman et al. |
| 5,544,010 A | 8/1996 | Schultz et al. |
| 5,751,548 A | 5/1998 | Hall et al. |
| 5,842,715 A | 12/1998 | Jones |
| 5,969,939 A | 10/1999 | Moss et al. |
| 6,007,038 A | 12/1999 | Han |
| 6,023,411 A | 2/2000 | Howell et al. |
| 6,049,450 A | 4/2000 | Cho et al. |
| 6,092,705 A | 7/2000 | Meritt |
| 6,129,321 A | 10/2000 | Minelli et al. |
| 6,130,727 A | 10/2000 | Toyozumi |
| 6,199,810 B1 | 3/2001 | Wu et al. |
| 6,208,508 B1 | 3/2001 | Ruch et al. |
| 6,216,927 B1 | 4/2001 | Meritt |
| 6,259,601 B1 | 7/2001 | Jaggers et al. |
| 6,279,977 B1 | 8/2001 | Chen |
| 6,292,236 B1 * | 9/2001 | Rosen ................. 224/311 |
| 6,443,574 B1 | 9/2002 | Howell et al. |
| 6,464,185 B1 | 10/2002 | Minelli et al. |
| 6,494,527 B1 | 12/2002 | Bischoff |
| 6,522,368 B1 | 2/2003 | Tuccinardi et al. |
| 6,530,547 B1 | 3/2003 | Wada |
| 6,556,435 B1 | 4/2003 | Helot et al. |
| 6,619,605 B2 | 9/2003 | Lambert |
| 6,663,155 B1 | 12/2003 | Malone et al. |
| 6,669,260 B2 | 12/2003 | Clark et al. |
| 6,678,892 B1 | 1/2004 | Lavelle et al. |
| 6,683,786 B2 | 1/2004 | Yin et al. |
| 6,685,016 B2 | 2/2004 | Swaim et al. |
| 6,702,238 B1 | 3/2004 | Wang |
| 6,717,798 B2 | 4/2004 | Bell et al. |

(Continued)

FOREIGN PATENT DOCUMENTS

FR    2801854    6/2001

(Continued)

*Primary Examiner*—Lori L Lyjak
(74) *Attorney, Agent, or Firm*—Welsh & Flaxman LLC

(57) ABSTRACT

An automobile entertainment system includes a video system having a video monitor, and a cradle secured within an automobile. The cradle is shaped and dimensioned for selectively receiving and securely holding the video system.

18 Claims, 14 Drawing Sheets

U.S. PATENT DOCUMENTS

| | | |
|---|---|---|
| 6,769,989 B2 | 8/2004 | Smith et al. |
| 6,899,365 B2 | 5/2005 | Lavelle et al. |
| 7,084,932 B1 | 8/2006 | Mathias et al. |
| 2001/0011664 A1 | 8/2001 | Meritt |
| 2002/0085129 A1* | 7/2002 | Kitazawa .................. 348/837 |
| 2002/0135974 A1 | 9/2002 | Bell et al. |
| 2002/0149708 A1 | 10/2002 | Nagata et al. |
| 2002/0163219 A1 | 11/2002 | Clark et al. |
| 2002/0184632 A1 | 12/2002 | Reitmeier |
| 2003/0128505 A1 | 7/2003 | Yin et al. |
| 2003/0137584 A1 | 7/2003 | Norvell et al. |
| 2003/0184137 A1 | 10/2003 | Jost |
| 2003/0192950 A1 | 10/2003 | Muterspaugh |
| 2004/0017652 A1 | 1/2004 | Billington et al. |
| 2004/0061995 A1 | 4/2004 | McMahon |
| 2004/0104905 A1 | 6/2004 | Chung et al. |
| 2004/0175155 A1 | 9/2004 | Liu |
| 2004/0212957 A1 | 10/2004 | Schedivy |
| 2004/0227695 A1 | 11/2004 | Schedivy |
| 2004/0227696 A1 | 11/2004 | Schedivy |
| 2004/0227861 A1 | 11/2004 | Schedivy |
| 2004/0228622 A1 | 11/2004 | Schedivy |
| 2005/0025466 A1 | 2/2005 | Yen et al. |
| 2006/0107295 A1 | 5/2006 | Margis et al. |
| 2006/0128303 A1 | 6/2006 | Schedivy |

FOREIGN PATENT DOCUMENTS

| | | |
|---|---|---|
| FR | 2817812 | 6/2002 |
| JP | 62-231847 | 10/1987 |
| JP | 01-300775 | 12/1989 |
| JP | 05-050883 | 3/1993 |
| WO | WO02/073574 | 9/2002 |

* cited by examiner

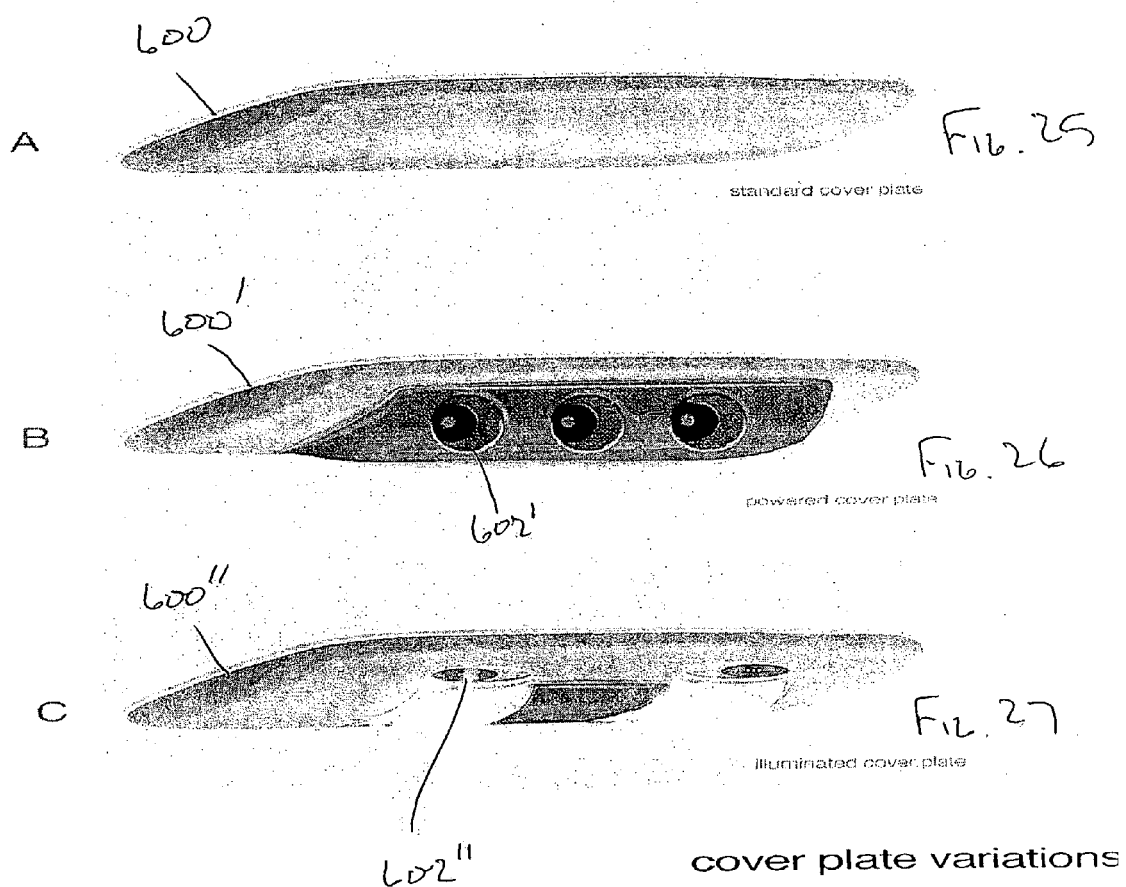
cover plate variations

VEHICLE ENTERTAINMENT SYSTEM

CROSS REFERENCE TO RELATED APPLICATION

This application is based upon U.S. Provision Application Ser. No. 60/690,874, filed Jun. 16, 2005, entitled "Vehicle Entertainment System".

BACKGROUND OF THE INVENTION

1. Field of the Invention

The invention relates to a vehicle entertainment system. More particularly, the invention relates to an entertainment system integrating a video source and video monitor within the ceiling of an automobile, wherein the video source and video monitor are detachably secured to the ceiling of an automobile.

2. Description of the Prior Art

Entertainment systems for automobiles are well known. As such, many advances have been made in the development of entertainment systems that make the otherwise tedious task of riding in an automobile more bearable. In addition to the development of overhead systems pioneered by the present inventor, systems that mount within the headrest of an automobile have also been developed.

These headrest entertainment systems allow multiple individuals to view a variety of different video sources within the same vehicle. However, and as those skilled in the art will certainly appreciate, it is desirable to provide added versatility to these entertainment system. The present invention attempts to accomplish this by providing a system whereby the video system may be selectively removed from an automobile and used at other locations.

SUMMARY OF THE INVENTION

It is, therefore, an object of the present invention to provide a vehicle entertainment system including a video system having a video monitor and a cradle secured within a ceiling of a vehicle. The cradle is shaped and dimensioned for selectively receiving and securely holding the video system, wherein the cradle includes a docking port with a face plate that is substantially flush with a headliner of the vehicle.

It is also an object of the present invention to provide an entertainment system wherein the video system includes a video source, and the video source is a DVD player or hard drive.

It is another object of the present invention to provide an entertainment system wherein the video system includes electrical connectors shaped and dimensioned for selective engagement with electrical connectors formed within the cradle.

It is a further object of the present invention to provide an entertainment system wherein the cradle includes a primary recess into which the video system is mounted.

It is also an object of the present invention to provide an entertainment system wherein the video system includes a release latch and a safety button preventing inadvertent actuation of the release latch.

It is another object of the present invention to provide an entertainment system including at least one docking station to which the video system may be selectively secured when not coupled to the cradle.

It is yet another object of the present invention to provide an entertainment system wherein the video system includes electrical connectors shaped and dimensioned for selective engagement with electrical connectors formed within the docking station.

It is also an object of the present invention to provide an entertainment system wherein the video system includes a base selectively secured to the cradle, and the base includes a means for pivoting the video monitor.

It is still a further object of the present invention to provide an entertainment system wherein the base includes means for pivoting the video monitor about multiple axes.

It is also another object of the present invention to provide an entertainment system including a cover for covering the cradle when it is not in use.

It is another object of the present invention to provide an entertainment system wherein the cover includes a light.

It is a further object of the present invention to provide an entertainment system wherein the cover includes a power source.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWING

FIGS. 25, 26 and 27 are perspective views of various covers which may be used in accordance with the embodiment disclosed with reference to FIG. 18.

DESCRIPTION OF THE PREFERRED EMBODIMENTS

Figure 1:
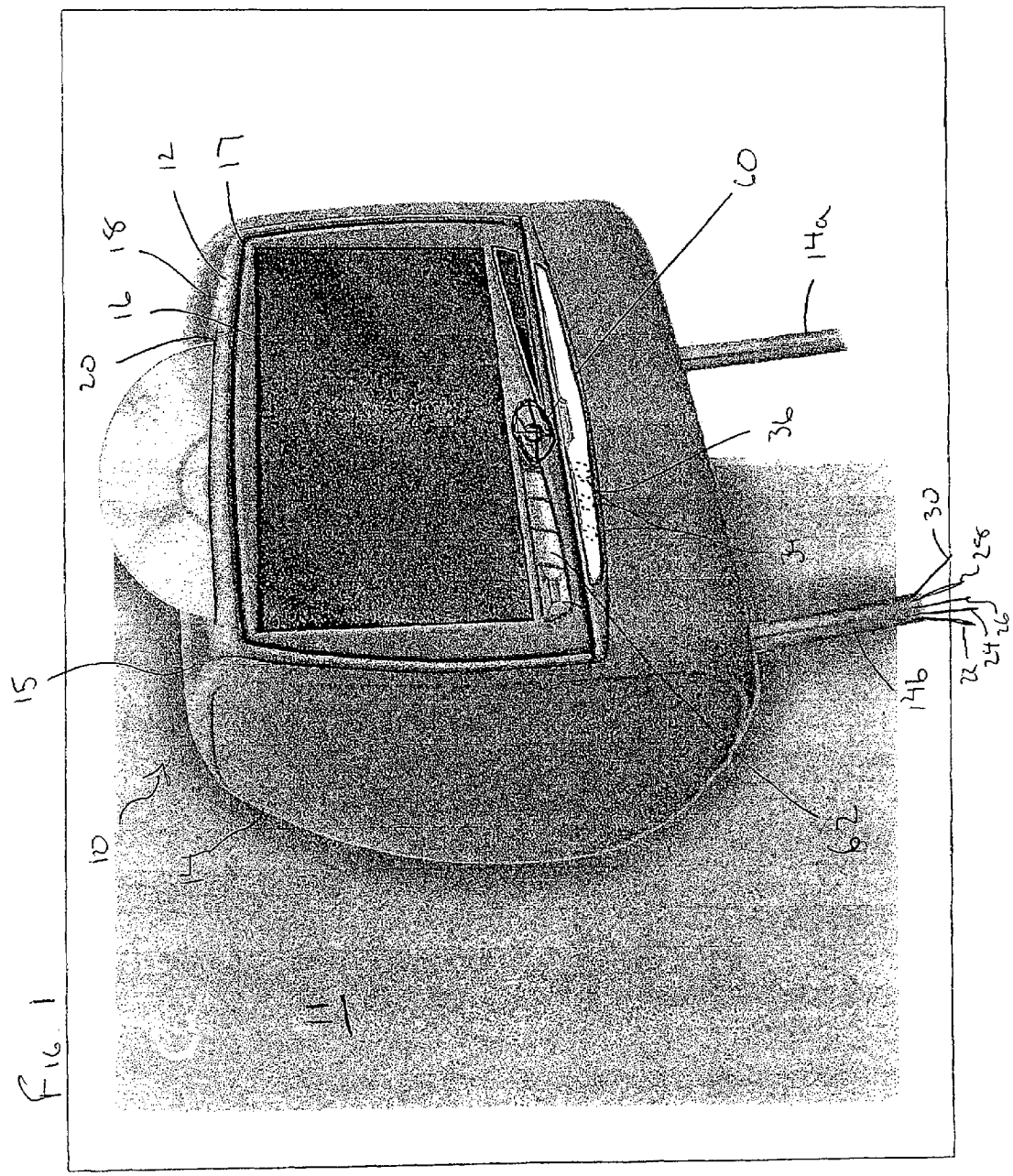
FIG. 1 is a front perspective view of an automobile entertainment system in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to FIGS. 1 to 11, and in accordance with a first embodiment of the present invention, an automobile entertainment system 10 is disclosed. The automobile entertainment system 10 is composed of a series of video and audio components integrated within an automobile 11. As those skilled in the art will certainly appreciate, the various embodiments of the present entertainment system are disclosed herein with reference to their use within an automobile. However, the entertainment system could certainly be used in other vehicles, for example, boats or planes, without departing from the spirit of the present invention.

In particular, the entertainment system 10 includes a video system 12 detachably mounted within a standard headrest 14 of an automobile 11. The video system 12 generally includes a video monitor 16 for presenting video content and a video source 20 integrated therewith.

In accordance with a preferred embodiment of the present invention, the video source is a DVD player 20 coupled to the video monitor 16 for the transmission of video content thereto. That is, the DVD player 20 or other video source is integrated within the same housing 18 as the video monitor 16. It is also contemplated that a hard drive 23 video source may also be integrated with the video monitor 16. As those skilled in the art will certainly appreciate, the hard drive 23 will include inputs for receiving video content and outputs for transmitting video content to the video monitor 16, both of which are well known to those skilled in the art. However, and as discussed below in greater detail, the video source may take a variety of forms without departing from the spirit of the present invention; for example, and not limited to, satellite video systems and Bluetooth wireless based systems.

The video system 12 is mounted along the rear portion of the headrest 14 such that an individual sitting in the rear seat of the automobile 11 may watch the media presented on the video monitor 16 without disturbing the driver of the automobile 11.

The video monitor 16, DVD player 20 and associated control components are mounted within the housing 18. As those skilled in the art will certainly appreciate, the video monitor 16 is pivotally mounted within a recess 17 formed in the housing 18. In accordance with a preferred embodiment, the video monitor 16 is a TFT LCD screen. However, it is contemplated that other monitor constructions, for example, plasma, Ultra High Definition VGA, touch screen VGA, organic LED, fabric based monitors (e.g., flexible TFT) etc., may be used without departing from the spirit of the present invention.

Although the present invention is disclosed herein as including a single monitor, it is contemplated the system could be designed with dual monitors for viewing from opposite sides of the vehicle. Such a system could include distinct DVD players associated with each monitor or a single DVD player linked to both monitors.

With regard to the DVD player 20, it is integrally molded within the housing 18 and positioned for insertion of DVDs behind the video monitor 16. By mounting the DVD player 20 in this way, a stable structure is developed that is well adapted for the automobile environment.

Figure 5:
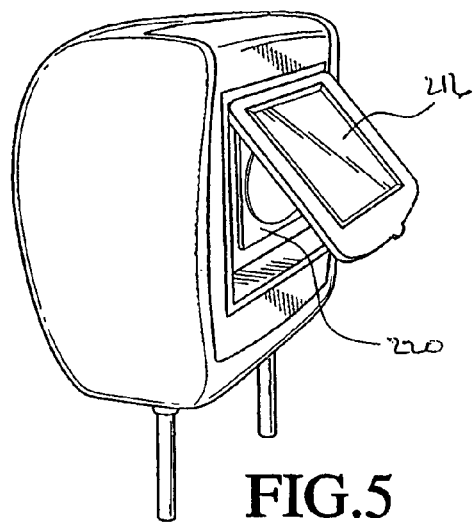
FIGS. 5, 6, 7 and 8 are views of entertainment systems in accordance with alternate embodiments of the present invention.
Figure 6:
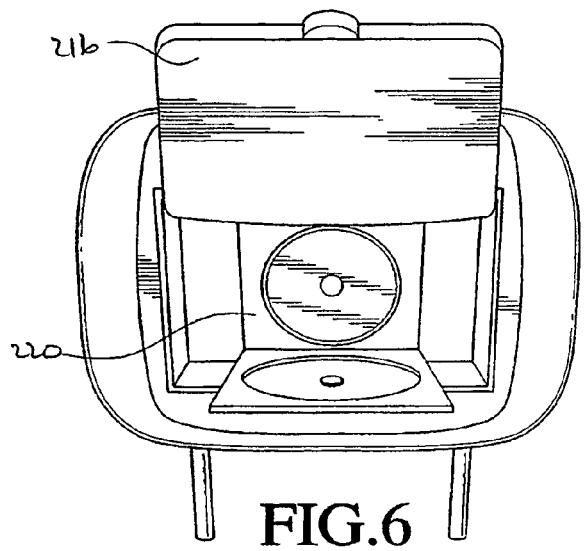
Figure 7:
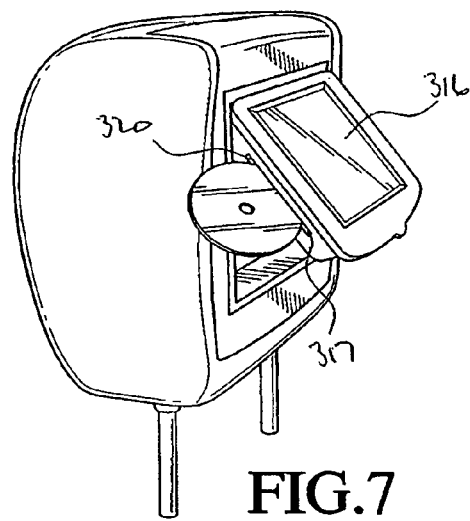
Figure 8:
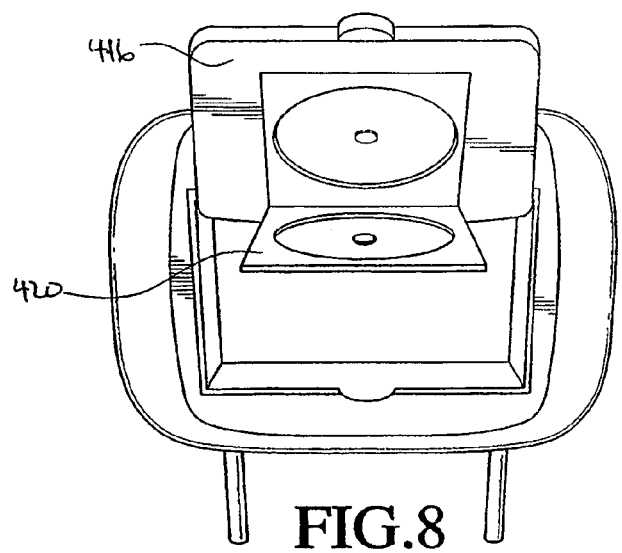

While the DVD player 20 is disclosed as being a slot-loaded design with insertion behind the video monitor, the DVD player could take a variety of other forms while still being integrated with the video monitor 16. With reference to FIGS. 5 and 6, the DVD player 220 may be positioned beneath the pivotally mounted video monitor 216. With reference to FIG. 7, the DVD player 320 may be integrated with the video monitor 316 and facilitate access via a side loading slot 317. Referring to FIG. 8, the DVD player 420 is integrated with the underside of the video monitor 416 and the DVD is snapped into DVD player 420 when the monitor 416 is pivoted upward. In addition, the DVD player may be designed with a built in TV tuner for providing the user with a choice of video sources.

As briefly mentioned above, the housing 18 is detachably secured to the headrest 14. In particular, the housing 18, including the video monitor 16, DVD player 20 and other related components, is detachably mounted within a recess 15 formed in the headrest 14. As such, the video system 12 may be removed from the automobile 11 and used at a variety of locations apart from the automobile 11. As will be discussed below in greater detail, the video system 12 may be used alone or in conjunction with a docking station 50', 50", 50'". Once removed, the video system 12 may be used in other automobiles 11 or within an individual's home. When used alone, a battery pack may be connected to the video system 12 and the video system 12 can thereby become a portable entertainment system.

A cradle 38 shaped and dimensioned for receiving the video system 12 is provided within the recess 15 of the headrest 14. As will be discussed below in greater detail, similar cradles 38', 38", 38'" may be provided at other locations permitting use of the video system 12 at other remote locations. It is contemplated that such a cradle 38, 38', 38", 38'" would be much like the docking stations utilized with laptop computers wherein individuals are permitted to readily remove the laptop from a docking station for use at another location remote from the docking station.

More specifically, the cradle 38 utilized in the headrest 14 includes quick release electrical connections 42 for the audio input 22, audio output 24, video input 26, video output 28 and power supply 30 (although one embodiment contemplates a system which connects only to a power supply). The video system 12 similarly includes mating electrical connections 44 for transmitting electricity and a/v signals between the cradle 38 and the video system 12. In particular, when the video system 12 is mounted upon the cradle 38, the respective electrical connections 42, 44 mate to provide for the transmission of power and a/v signals between the video system 12 and the cradle 38. As those skilled in the art will certainly appreciate, other readily removable electrical connections for other purposes may also be supplied if one determines they are so needed.

In addition to the electrical connections 42 provided on the cradle 38, the cradle 38 also includes a connecting mechanism 46 designed for selectively retaining the video system 12 within the cradle 38. The connecting mechanism 46 permits ready and selective attachment of the video system 12 to the headrest 14 while preventing vibrations and other damaging movements that commonly occur in an automobile 11.

In accordance with a preferred embodiment of the present invention, the connecting mechanism 46 includes a release button 47 and a latch member 48. The release button 47 is actuated to rotate the latch member 48 and permit removal of the video system 12 from the cradle 38. Insertion of the video system 12 within the headrest 14 is achieved by simply setting the video system 12 within the cradle 38 and applying sufficient force to the video system for overcoming the rotational force of the latch member 48 to force the video system 12 into a secure position. While a particular coupling structure is disclosed in accordance with a preferred embodiment of the present invention, those skilled in the art will appreciate that a variety of selectively releasable coupling structures may be employed without departing from the spirit of the present invention.

The entertainment system 10 further includes cables 32 extending through the headrest 14. These cables ultimately link audio, video and power to the cradle 38 and video system 12. More specifically, the cradle 38 and video system 12 are electrically connected to the remainder of the automobile 11 via electrical communication lines extending through one or both of the extension arms 14a, 14b of the headrest 14. For example, and as will be discussed below in substantial detail, a video input 22, video output 24, audio input 26, audio output 28 and power source 30, may be respectively connected to the cradle 38 for ultimate connection with the video system 12 via the mating electrical connections 42, 44 of the respective cradle 38 and video system 12.

Specific wiring arrangements and linking of various video systems within an automobile in accordance with preferred embodiments of the present invention are disclosed in U.S. patent application Ser. No. 10/920,425, entitled "AUTOMOBILE ENTERTAINMENT SYSTEM", filed Aug. 18, 2004, which is incorporated herein by reference, U.S. patent application Ser. No. 10/895,111, entitled "AUTOMOBILE ENTERTAINMENT SYSTEM", filed Jul. 21, 2004, which is incorporated herein by reference, U.S. patent application Ser. No. 10/895,110, entitled "AUTOMOBILE ENTERTAINMENT SYSTEM LINKING MULTIPLE VIDEO SYSTEM FOR COORDINATED SHARING OF VIDEO CONTENT", filed Jul. 21, 2004, which is incorporated herein by reference, U.S. patent application Ser. No. 10/895,086, entitled "HOUSING FOR AN AUTOMOBILE ENTERTAINMENT SYSTEM", filed Jul. 21, 2004, which is incorporated herein by reference, U.S. patent application Ser. No. 10/895,099, entitled "INSTALLATION APPARATUS FOR AN AUTOMOBILE ENTERTAINMENT SYSTEM", filed Jul. 21, 2004, which is incorporated herein by reference, U.S. patent application Ser. No. 10/920,431, entitled "AUTOMOBILE ENTERTAINMENT SYSTEM", filed Aug. 18, 2004, which is incorporated herein by reference, and U.S. patent application Ser. No. 10/920,430, entitled "AUTOMOBILE ENTERTAINMENT SYSTEM", filed Aug. 18, 2004, which is incorporated herein by reference.

As briefly mentioned above, a DVD player 20 is integrated with the video monitor 16 to form the video system 12 of the present invention. The DVD player 20 is integrated with the video monitor 16 to facilitate convenient viewing of media on the video monitor 16 while also conserving space within the limited confines of the automobile 11. For example, by integrating the DVD player 20 with the video monitor 16 individuals using the video monitor 16 may conveniently insert DVDs within the video system 12 without reaching within another part of the automobile 11.

With this in mind, it is contemplated the present video system 12 may be positioned within any headrest 14 employed in a car, truck, SUV, or van. The video system 12 may be placed within all vehicle headrests (and, with regard to automobiles having three rows of seats, video systems may be positioned within both the front seat headrests and the second seat headrests). In this way, individuals sitting on opposite sides of an automobile 11 can watch different video content on different video systems 12. In fact, different videos may be viewed, and wireless headphones may still be employed, by utilizing a multi-channel IR transmitter in conjunction with the present system.

The present video system 12 is provided with the ability to offer a variety of functionalities. These functionalities may be hardwired or programmed within the video system 12 or the functionalities may be added in a modular manner via an expansion slot 40 provided within the video system 12. Contemplated functionalities include, but are not limited to satellite radio (for example, Serius, XM), Pictel phone, satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc.

Enhanced usage is further provided by the inclusion of RCA ports 34, or other a/v input/outputs, formed within the cradle 38 and contained behind a cover 36 which may be selectively opened to reveal the ports 34. The inclusion of these ports 34 allows for ready attachment of the present video system 12 to other remote a/v sources (for example, game consoles, portable digital music players, etc.).

In addition, and in accordance with a preferred embodiment, a broadcast television receiver 19 is integrated with the video monitor 16 and/or the headrest 14. More particularly, and with reference to FIG. 2, the housing 18 is provided with a rear recess 37 shaped and dimensioned for receiving a television receiver 19. The television receiver 19 may, therefore, be wired for use in conjunction with the video monitor 16 in a manner known to those skilled in the art.

The television receiver 19 is further provided with an antenna 21. The antenna 21 is electrically connected to the television receiver 19 for the transmission of over-the-air signals. The antenna 21 is substantially U-shaped and is wrapped about the housing 18. While a U-shaped antenna wrapped about the housing is disclosed in accordance with a preferred embodiment of the present invention, the antenna may be oriented within a variety of locations within the headrest without departing from the spirit of the present invention.

Control of the video system 12, including the video monitor 16, DVD player 20 and other components of the video system 12, is facilitated by the provision of control buttons along the outer surface of the video system 12. In accordance with a preferred embodiment of the present invention, the control buttons take the form of a multifunction controller 60 permitting movement of a cursor shown upon various interfaces displayed upon the video monitor 16. In addition, conventional control buttons 62 may also be provided for control of traditional functions. In addition to the provision of manual control buttons 62, the video system 12 may further include a remote control (not shown) such that an individual need not actually touch the video system 12 to control the video content or the volume generated by the video system 12. Once again, and as those skilled in the art will certainly appreciate, a variety of remote control systems may be utilized without departing from the spirit of the present invention.

As briefly mentioned above, the present video system 12 is adapted for removal from the headrest 14 of an automobile 11 for use at a variety of other locations. In accordance with a preferred embodiment of the present invention, the other locations are provide with a docking station 50', 50", 50'" including auxiliary cradles 38', 38", 38'" shaped and dimensioned for receiving the video system 12 and coupling the video system 12 to power sources and a/v sources in a manner similar to the cradle 38 used in conjunction with the headrest 14.

Figure 9:
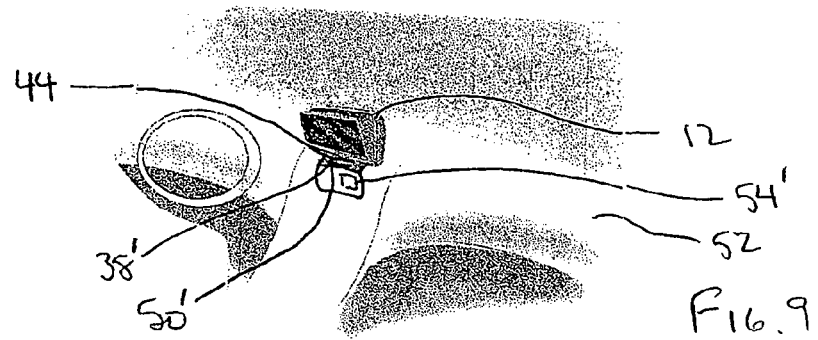
FIG. 9 shows the video system of FIG. 1 mounted within a dash docking station.

For example, and with reference to FIG. 9, a docking station 50' for use in conjunction with the dash 52 of a conventional automobile 11. The docking station 50' includes an auxiliary cradle 38' (with electrical connections and a connecting mechanism (not shown)) shaped and dimensioned for receiving and securely holding the video system 12 and coupling the video system 12 to power sources and a/v sources in a manner similar to the cradle 38 used in conjunction with the headrest 14. The docking station 50' is mounted upon the dash 52 of an automobile 11 and is wired for connection to a power source and a/v sources (not shown). In addition, the dash docking station 50' may include an integrated satellite receiver 54' for providing satellite content to the passenger of the automobile 11 by transmitting the satellite signal through the cradle 38' and into the video system 12 via the respective electrical connections of the cradle 38' and the video system 12. This embodiment is particularly useful where the video system 12 includes functionality relating to the provision of GPS guidance information. With this in mind, the driver will be able to selectively use the video system 12 for accessing guidance information when needed and return the video system 12 to the headrest 14 when guidance information is no longer needed.

Figure 10:
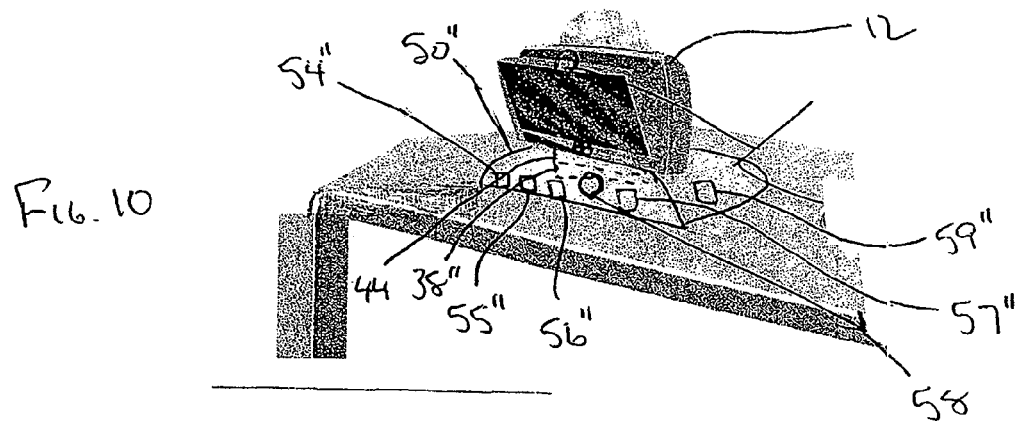
FIG. 10 shows the video system of FIG. 1 mounted within a mobile docking station.

With reference to FIG. 10, a mobile docking station 50" may also be provided. The mobile docking station 50" also includes an auxiliary cradle 38" (with electrical connections and a connecting mechanism (not shown)) shaped and dimensioned for receiving and securely holding the video system 12 and coupling the video system 12 to power sources and a/v sources in a manner similar to the cradle 38 used in conjunction with the headrest 14. The docking station 50" may include a battery pack 55", a/v inputs 56", a/v outputs 57", internet capability, speakers 58", cable input 59" and/or an integrated satellite receiver 54". These components are linked to the video system 12 via the cradle 38" which transmits the relevant signals to and from the video system 12 via the respective electrical connections of the cradle 38" and the video system 12.

Figure 11:
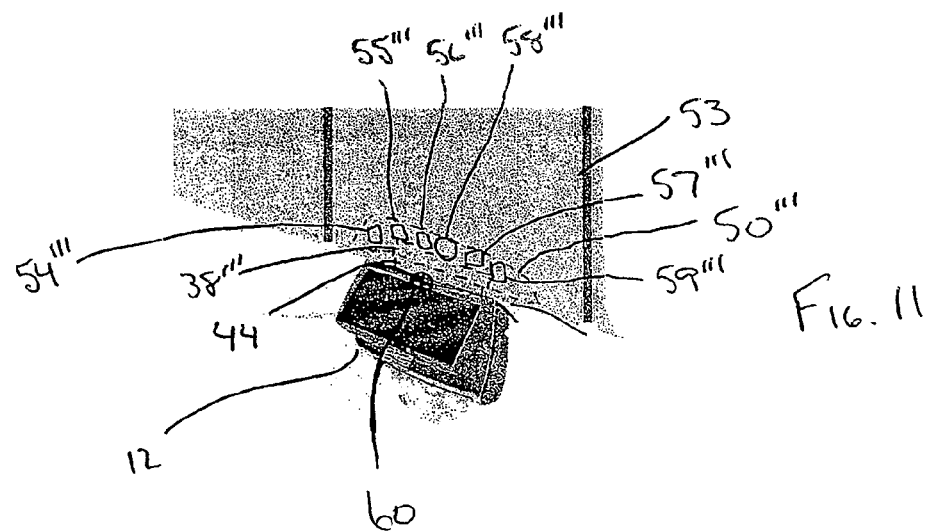
FIG. 11 shows the video system of FIG. 1 mounted within a static docking station.

With reference to FIG. 11, yet a further embodiment of a docking station 50'" is disclosed. This docking station 50'" is adapted for static mounting within a household, office or other locations (for example, beneath a kitchen cabinet 53'"). The docking station 50'" includes an auxiliary cradle 38'" (with electrical connections and a connecting mechanism (not shown)) shaped and dimensioned for receiving and securely holding the video system 12 and coupling the video system to power sources and a/v sources in a manner similar to the cradle 38 used in conjunction with the headrest 14. The docking station 50'" may include a battery pack 55'", a/v inputs 56'", a/v outputs 57'", Internet capability, speakers 58'", cable input 59'" and/or an integrated satellite receiver 54'". These components are linked to the video system 12 via the cradle 38'" which transmits the relevant signals to and from the video system 12 via the respective electrical connections of the cradle 38'" and the video system 12.

As shown in FIG. 11, when the video system 12 is mounted beneath a kitchen cabinet 53 as shown, it may be necessary to mount the video system 12 upside down when compared to its mounting within an automobile headrest 14. With this in mind, the video system 12 is provided with the ability to rotate to the image shown on the video monitor 16 so that the video system 12 may be used in a variety of orientation. The possible rotation of the image shown on the video monitor 16 is complimented by the multifunctional controller 60 that adjusts to rotation of the image such that the controller 60 is calibrated to function in accordance with the orientation of the screen image.

In addition to providing for the inclusion of a removable video system 12 within the headrest 14 of an automobile 11 as shown above with reference to FIGS. 1 to 11, it is further contemplated an entertainment system 110 providing for a selectively removable video system 112 mounted within the ceiling of an automobile 111. In accordance with this alternate embodiment, and with reference to FIG. 12 to 17, the video system 112 is selectively mounted to an overhead cradle 138.

As those skilled in the art will certainly appreciate, the ceiling mounted system and the headrest mounted system may be integrated within a single vehicle to provide for a choice between a ceiling mount use and a headrest mount use. This would requiring the use of a universal cradle structure allowing the owner to move the video system from one location to another location without needing to incur the cost of purchasing a video system for each location. The individual could place the video system within the ceiling mounted cradle when many people are riding the automobile and move the video system to the headrest when only one passenger is viewing the media present upon the video system.

As with the embodiment disclosed above, the video system 112 is detachably mounted within a cradle 138 secured to the ceiling 113 of an automobile 111. The video system 112 generally includes a video monitor 116 for presenting media content and a video source 120 integrated therewith.

In accordance with a preferred embodiment of the present invention, the video source is a DVD player 120 coupled to the video monitor 116 for the transmission of video content thereto. That is, the DVD player 120 or other video source is integrated within the same video housing 118 as the video monitor 116. It is also contemplated that a hard drive 123 video source may also be integrated with the video monitor 116. As those skilled in the art will certainly appreciate, the hard drive 123 will include inputs for receiving video content and outputs for transmitting video content to the video monitor 116, both of which are well known to those skilled in the art. However, and as discussed above with reference to embodiment disclosed in FIGS. 1 to 11, the video source may take a variety of forms without departing from the spirit of the present invention.

The video system 112 is mounted to the cradle 138 for viewing in the rear of the automobile 111. With this in mind, the housing 118 of the video system 112 is provided with a pivotal coupling member 139 allowing the video system 112 to pivot relative to the cradle 138 for storage when the video system 112 is not in use. It is also contemplated that the coupling member 139 may be designed to provide for rotation of the housing 118 about multiple axes. In this way, the video system 112 may be freely rotated to improve viewing regardless of the where the video system 112 is being used.

The video monitor 116, DVD player 120 and associated control components are mounted within the housing 118. In accordance with a preferred embodiment, the video monitor 116 is a TFT LCD screen. However, it is contemplated that other monitor constructions, for example, plasma, Ultra High Definition VGA, touch screen VGA, organic LED, fabric based monitors (e.g., flexible TFT) etc., may be used without departing from the spirit of the present invention.

With regard to the DVD player 120, it is integrally molded within the housing 118 and positioned for insertion of the DVDs behind the video monitor 116. By mounting the DVD player 120 in this way, a stable structure is developed that is well adapted for the automobile environment. While the DVD player 120 is disclosed as being a slot-loaded design with insertion behind the video monitor 116, the DVD player could take a variety of other forms without departing from the spirit of the present invention.

As briefly mentioned above, the housing 118 is detachably secured to the ceiling mounted cradle 138. In particular, the housing 118, including the video monitor 116, DVD player 120 and other related components, is detachably mounted within a recess 141 formed in the cradle 138. As such, the video system 112 may be removed from the automobile 111 and used at a variety of locations apart from the automobile 111. As will be discussed below in greater detail, the video system 112 may be used alone or in conjunction with a docking station 150', 150'', 150'''. Once removed, the video system 112 may be used in other automobiles or within an individual's home. When used alone, a battery pack may be connected to the video system 112 and the video system 112 can thereby become a portable entertainment system.

The cradle 138 is shaped and dimensioned for receiving and securing the video system 112 to the ceiling 113 of the automobile 111. As was discussed above with reference to the headrest based system, similar cradles 138', 138'', 138''' may be provided at other locations permitting use of the video system 112 at other remote locations.

More specifically, the cradle 138 utilized in accordance with a preferred embodiment of the present invention includes quick release electrical connections 142 for the audio input 122, audio output 124, video input 126, video output 128 and power supply 130 (although one embodiment contemplates a system which connects only to a power supply). The video system 112 similarly includes mating electrical connections 144 for transmitting electricity and a/v signals between the cradle 138 and the video system 112. In particular, when the video system 112 is mounted upon the cradle 138 the respective electrical connections 142, 144 mate to provide for the transmission of power and a/v signals between the video system 112 and the cradle 138. As those skilled in the art will certainly appreciate, other readily removable electrical connections for other purposes may also be supplied if one determines they are so needed.

In addition to the electrical connections provided on the cradle 138, the cradle 138 also includes a connecting mechanism 146 designed for selectively retaining the video system 112 within the cradle 138. The connecting mechanism 146 permits ready and selective attachment of the video system 112 to the ceiling 113 of the automobile 111 while preventing vibrations and other damaging movements that commonly occur in an automobile 111.

In accordance with a preferred embodiment of the present invention, the connecting mechanism 146 includes a release button 147 and a latch member 148. The release button 147 is actuated to rotate the latch member 148 and permit removal of the video system 112 from the cradle 138. Insertion of the video system 112 within the cradle recess 141 is achieved by simply setting the video system 112 within the recess 141 of the cradle 138 and overcoming the rotational force of the latch member 148 to force the video system 112 into a secure position. While a particular coupling structure is disclosed in accordance with a preferred embodiment of the present invention, those skilled in the art will appreciate that a variety of selectively releasable coupling structures may be employed without departing from the spirit of the present invention.

The entertainment system further includes cables 132 extending through the ceiling and the cradle 138. These cables 132 ultimately link audio, video and power to the cradle 138 and video system 112. More specifically, the cradle 138 and video system 112 are electrically connected to the remainder of the automobile 111 via electrical communication lines in a manner know to those skilled in the art.

As discussed above, specific wiring arrangements and linking of various video systems within an automobile in accordance with preferred embodiments of the present invention are disclosed in commonly owned patent applications that are incorporated herein by reference.

The present video system 112 is provided with the ability to offer a variety of functionalities. These functionalities may be hardwired or programmed within the video system 112 or the functionalities may be added in a modular manner via an expansion slot 140 provided within the video system 112. Contemplated functionalities include, but are not limited to satellite radio (for example, Serius, XM, Pictel phone, satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc.

Figure 2:
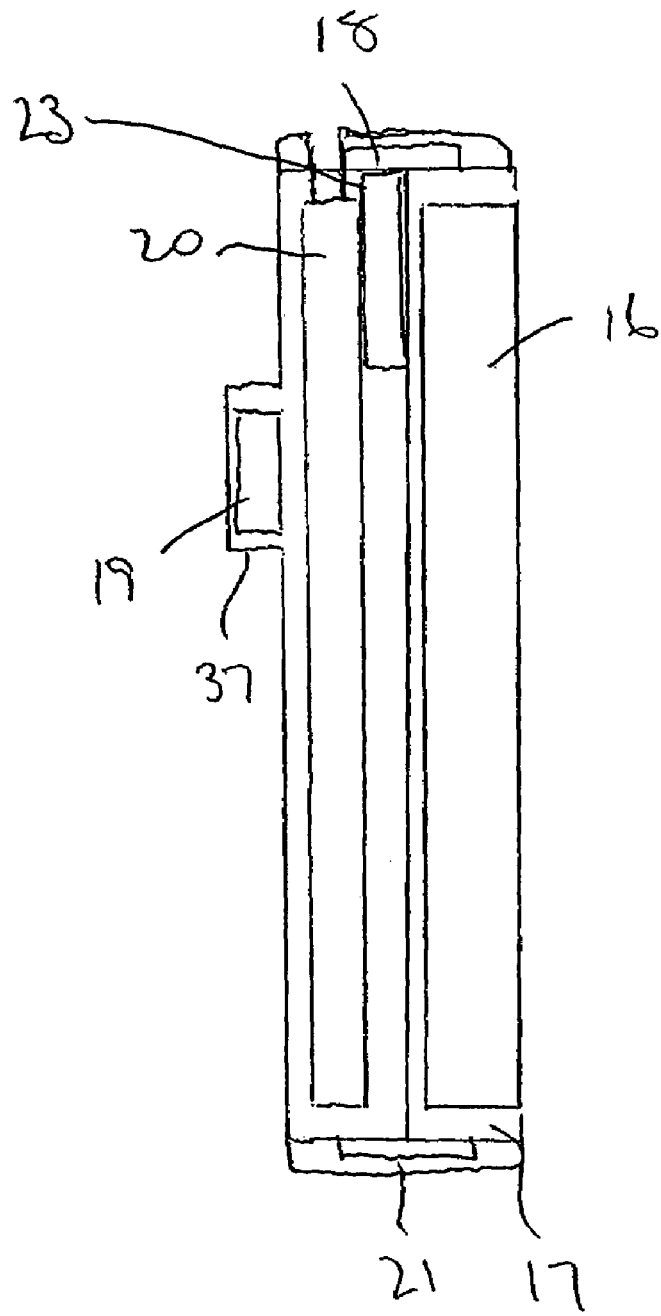
FIG. 2 is a cross sectional view of the housing of the video system shown in FIG. 1.
Figure 3:
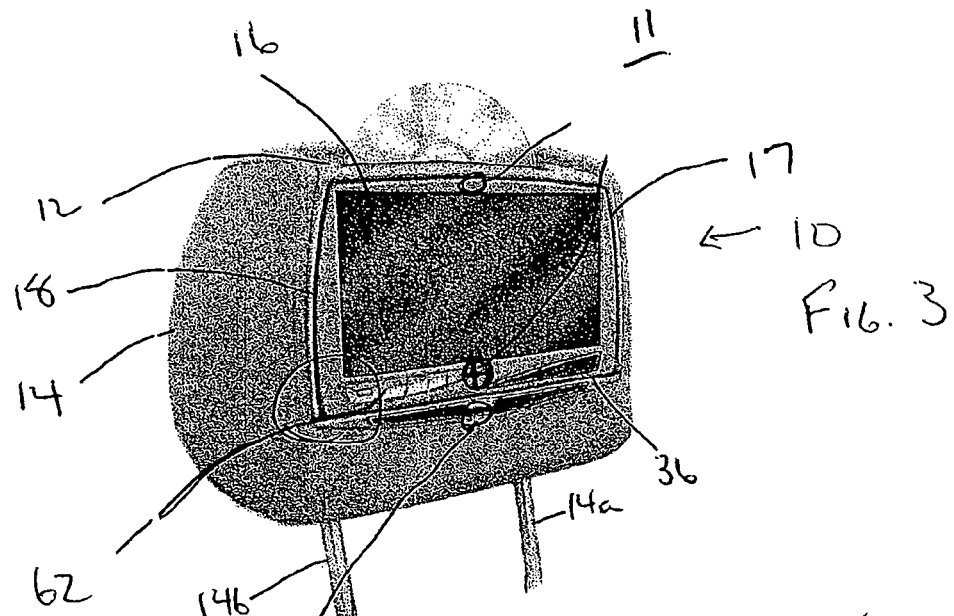
FIGS. 3 and 4 are front perspective views showing the entertainment system with the video system coupled to the headrest and detached from the headrest.
Figure 4:
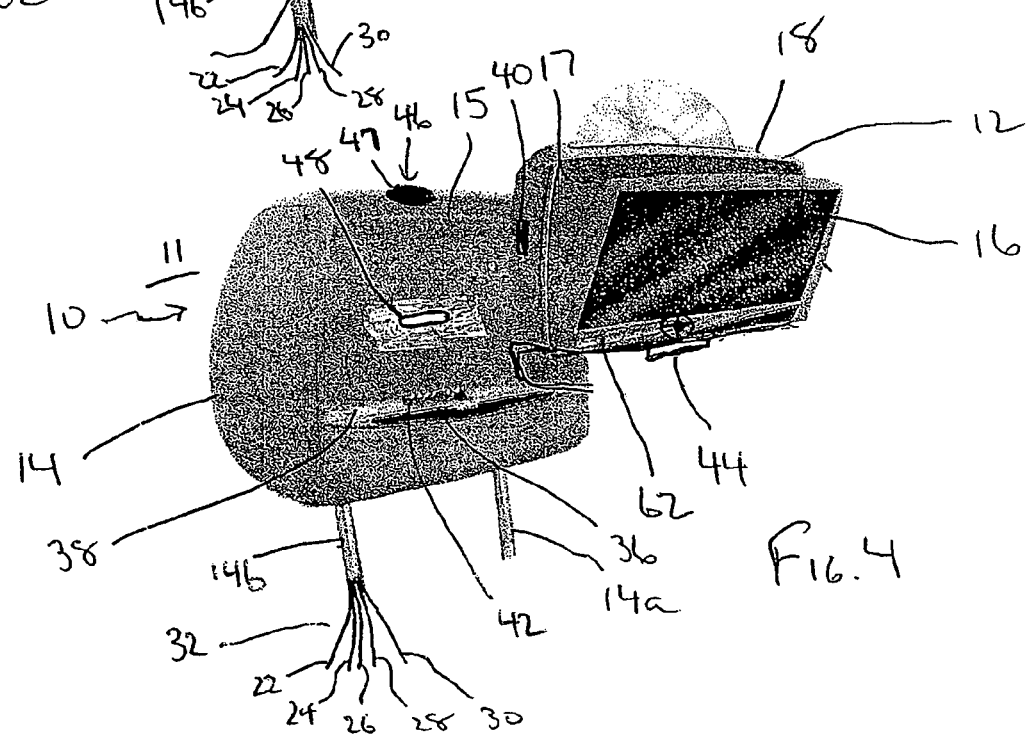

In addition, and in accordance with a preferred embodiment, a broadcast television receiver and an antenna as discussed above with reference to the prior embodiment shown in FIG. 2 is integrated with the video system 112.

Control of the video system 112, including the video monitor 116, DVD player 120 and other components of the video system 112, is facilitated by the provision of control buttons along the outer surface of the video system 112. In accordance with a preferred embodiment of the present invention, the control buttons take the form of a multifunction controller 160 permitting movement of a cursor shown upon various interfaces displayed upon the video. In addition, conventional control buttons 162 may also be provided for control of traditional functions. In addition to the provision of manual control buttons, the video system 112 may further include a remote control (not shown) such that an individual need not actually touch the video system 112 to control the video content or the volume generated by the video system 112.

Referring to FIGS. 18, 19, 20 and 21, an alternate video system 512 and mounting structure are disclosed. As with the prior embodiment, the video system 512 is adapted for selective mounting within the ceiling 513 of an automobile 511, although the concepts underlying this embodiment provide for the possibility of selectively mounting the video system within a variety of locations within an automobile. As will be appreciated based upon the following disclosure, this embodiment provides a video system 512 that may be mounted at a variety of distinct locations within an automobile 511 in a discrete and convenient manner. This is achieved by providing a video system 512 having a limited profile and a low profile cradle 538 mounting within the ceiling 513 (or other automobile locations) in a manner fully integrating the cradle with the ceiling structure.

As with the embodiment disclosed above, the video system 512 is detachably mounted within a cradle 538 secured to the ceiling 513 of an automobile 511. The video system 512 generally includes a video monitor 516 for presenting media content and a video source 520 integrated therewith.

In accordance with a preferred embodiment of the present invention, the video source is a DVD player 520 coupled to the video monitor 516 for the transmission of video content thereto. That is, the DVD player 520 or other video source is integrated within the same video housing 518 as the video monitor 516. It is also contemplated that a hard drive 523 video source may also be integrated with the video monitor 516. As those skilled in the art will certainly appreciate, the hard drive 523 will include inputs for receiving video content and outputs for transmitting video content to the video monitor 516, both of which are well known to those skilled in the art. However, and as discussed above with reference to the prior embodiments, the video source may take a variety of forms without departing from the spirit of the present invention.

The video monitor 516, DVD player 520, hard drive 523 and associated control components are mounted within the housing 518. In accordance with a preferred embodiment, the video monitor 516 is a TFT LCD screen. However, it is contemplated that other monitor constructions, for example, plasma, Ultra High Definition VGA, touch screen VGA, organic LED, fabric based monitors (e.g., flexible TFT) etc., may be used without departing from the spirit of the present invention.

With regard to the DVD player 520, it is integrally molded within the housing 518 and positioned for insertion of the DVDs behind the video monitor 516. By mounting the DVD player 520 in this way, a stable structure is developed that is well adapted for the automobile environment. While the DVD player is disclosed as being a slot-loaded design with insertion behind the video monitor, the DVD player could take a variety of other forms without departing from the spirit of the present invention.

The video system 512 is detachably mounted within a cradle 538 formed in the ceiling 513 of the automobile 511. As will be appreciate based upon the following disclosure, the design of the video system 512 and cradle 538 allows for the creation of multiple cradles 538 within an automobile, permitting selective positioning of the video system 512 at the various cradle 538 locations within the automobile 511.

More particularly, the base 564 of the video system 512 is selectively mounted to a cradle 538 formed within the ceiling 513 of the automobile 511 in a manner that permits rotation of the video housing 518 about multiple axes. The base 564 extends from an edge of the video housing 518. The base 564 includes a first hinge 566 that facilitates rotation of the video housing 518 about an axis substantially parallel to the ceiling 513 of the automobile 511 for movement from its storage position to a downward position for viewing thereof. The base 564 includes a second hinge 568 that permits rotation of the video housing 518 about an axis substantially perpendicular to the axis of the first hinge 566. As such, the second hinge 568 allows for rotation of the video housing 518 in a manner that facilitates viewing of the video monitor 516 from opposite sides of the automobile 511. The video system 512 is, therefore, designed for rotation about multiple axes and may be freely rotated to improve viewing regardless of the where the video system 512 is being used.

The base 564 further includes a projecting attachment member 570 permitting selective coupling of the video system 512 within the automobile 511. The attachment member 570 includes a fastening mechanism 572 which permits secure and convenient attachment/removal of the video system 512 from the cradle 538. More particularly, the fastening mechanism 572 includes spring 589 biased first and second latch members 574a, 574b shaped and dimensioned for engaging respective first and second latching recesses 576a, 576b formed on opposite sides of the cradle 538. The first and second latch members 574a, 574b are respectively actuated by primary release buttons 578a, 578b positioned at opposite ends of the video system base 564. By pushing the release buttons 578a, 578b, the first and second latch members 574a, 574b disengage from the first and second recesses 576a, 576b, permitting the removal of the video system 512 from the cradle 538.

Inadvertent release of the video system 512 from the cradle 538 is achieved through the provision of first and second safety buttons 580a, 580b which selectively lock the first and second latch members 574a, 574b in their latched position. More particularly, each of the first and second safety buttons 580a, 580b include an obstructing member 582, which sits within the path of the first and second latch members 574a, 574b preventing movement thereof. Each of the obstructing members 582, however, includes a release aperture 584 which aligns with a projection 586 of the respective latch member 574a, 574b when the safety button 580a, 580b is pressed to permit movement of the latch member 574a, 574b and release of the video system 512. Each of the first and second safety buttons 580a, 580b are spring 588 biased to ensure they remain in their safety position unless intentionally pushed to permit movement of the first and second latch members 574a, 574b.

Figure 22:
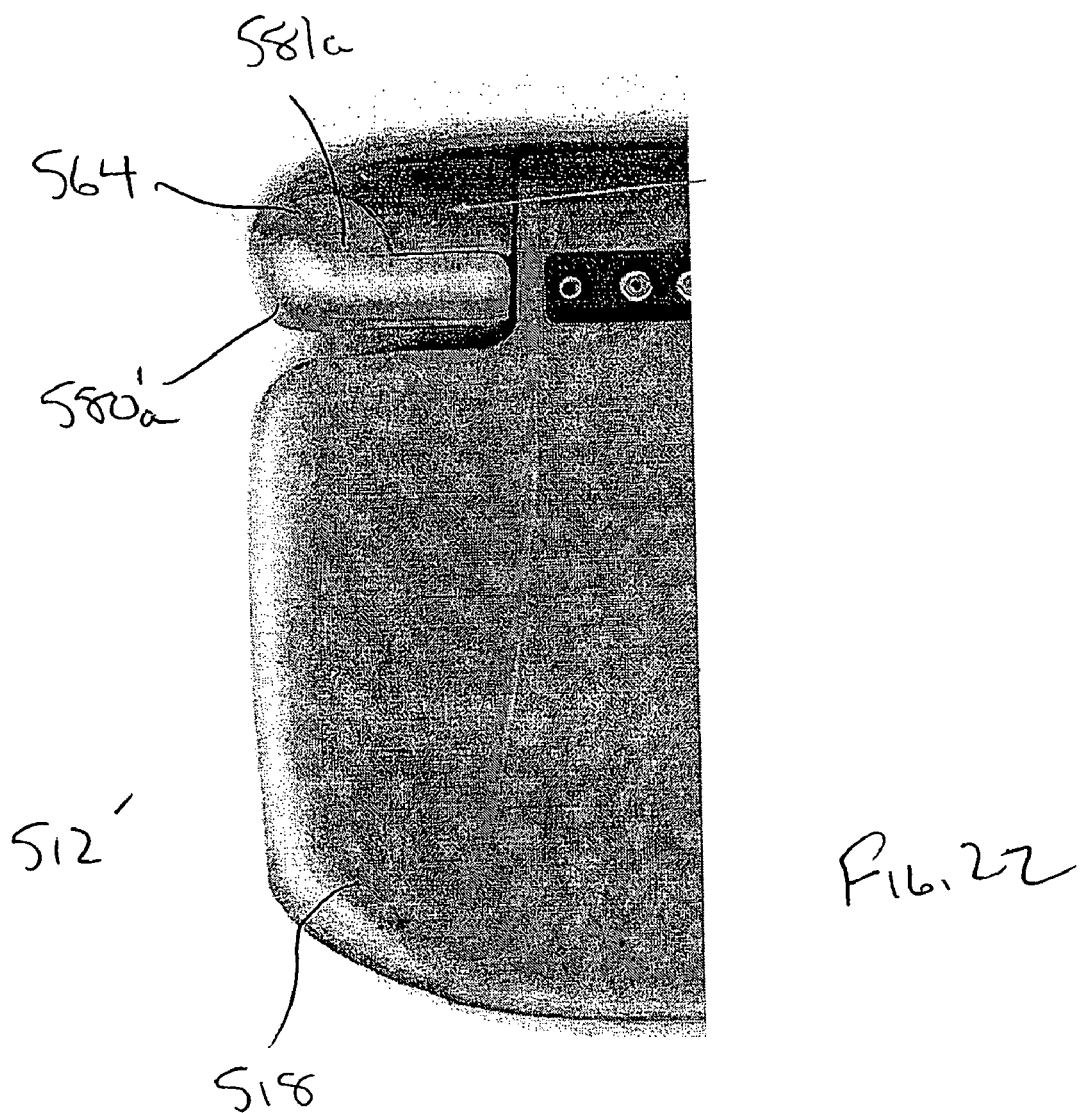
FIGS. 22, 23 and 24 are respectively a plan, perspective view and perspective view of a video system in accordance with an alternate embodiment of the system shown in FIG. 18.
Figure 23:
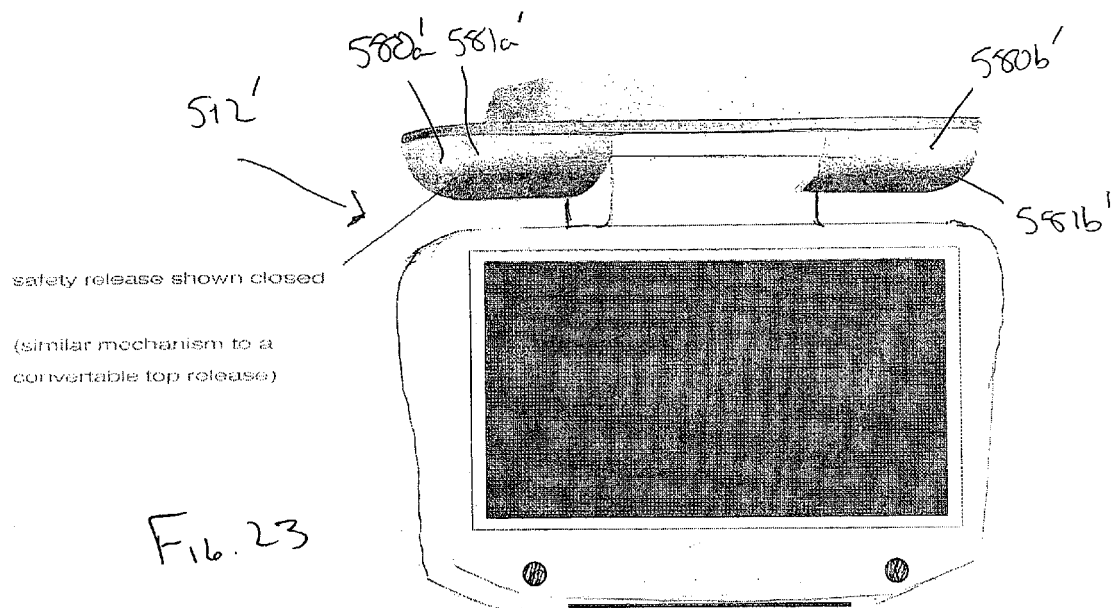
Figure 24:
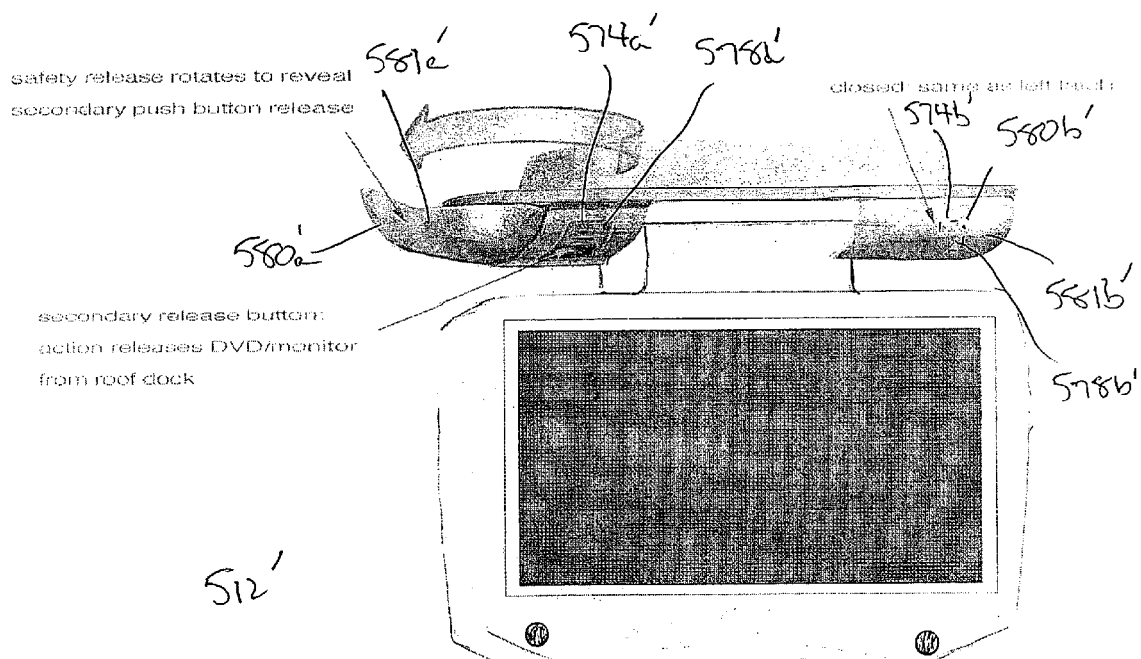

Referring to FIGS. 22, 23 and 24, the appearance of the video system 512' may be further enhanced by integrating the safety buttons 580a', 580b' with cover plates 581a, 581b positioned at the opposite ends of the base 564'. In accordance with this embodiment, rotation of the cover plates 581a, 581b actuates to the safety button 580a, 580b to permit actuation of the first and second latch members 574a, 574b and reveal the first and second release buttons 578a'.

The cradle 538 is shaped and dimensioned for receiving and securing the video system 512 to the ceiling 513 of the automobile 511. As was discussed above with reference to the other embodiments, similar cradles may be provided at other locations permitting use of the video system 512 at other remote locations.

As with the prior embodiments, the cradle 538 utilized in accordance with a preferred embodiment of the present invention includes quick release electrical connections 542 for the audio input 522, audio output 524, video input 526, video output 528 and power supply 530 (although one embodiment contemplates a system which connects only to a power supply). The video system 512, and particularly, the base 564 of the video system 512, includes mating electrical connections 544 for transmitting electricity and a/v signals between the cradle 538 and the video system 512. In particular, when the video system 512 is mounted upon the cradle 538, the respective electrical connections 542, 544 mate to provide for the transmission of power and a/v signals between the video system 512 and the cradle 538. As those skilled in the art will certainly appreciate, other readily removable electrical connections for other purposes may also be supplied if one determines they are so needed.

In addition to the electrical connections provided on the cradle 538, the cradle 538 also includes a fastening mechanism 590 adapted for selective engagement with the fastening mechanism 572 of video system 512. The fastening mechanism 572 of the cradle 538 is composed of a primary recess 592 into which the projecting attachment member 570 of the base 564 of the video system 512 may be positioned. The fastening mechanism 590 of the cradle 538 also includes the first and second latching recesses 576a, 576b that are shaped and dimensioned for selectively and securely coupling with the first and second latch members 574*a*, 574*b* of the video system base 564. As those skilled in the art will certainly appreciate, the primary recess of the cradle and the projecting attachment member of the base may be formed in a variety of shapes so long as they are designed to provide for a secure attachment with very little play between the attached components.

The usefulness of the present embodiment is enhanced by the fact that the cradle 538 is substantially recessed within the ceiling 513 of the automobile 511. More particularly, each cradle 538 installed with an automobile 511 is positioned such that the face plate 592 is substantially flush with the headliner 594, or other automobile surface, directly adjacent thereto. With this in mind, the cradle 538 is constructed with a metal mounting plate 596 directly secured to the ceiling 513 of the automobile 511 and a ceiling docking port 598 secured thereto. The ceiling docking port 598 includes the electrical and mechanical components discussed above which allow for the direct attachment of the video system 512 thereto.

The installation of the cradle 538 is intended to provide for an aesthetically pleasing appearance and the ceiling docking port 598 is, therefore, provide with a face plate 592 which substantially aligns with and is, therefore, flush with the headliner 594 of the automobile 511. Aesthetics are further enhanced by the provision of a cover member 600, 600', 600" which may be selective placed over the ceiling docking port 598 when it is not in use. The cover member 600, 600', 600" is preferably frictionally engaged with docking port 598 when positioned for covering. As shown with reference to FIGS. 25, 26 and 27, the cover member may be a simple cover 600 (see FIG. 25), a powered cover 600' with various power sources 602' extending therefrom (see FIG. 26) or an illuminating cover 600" with lights 602" (see FIG. 27). Where the covers require power, the cover is provided with an electrical connection allowing the cover to tap into the power supply of the cradle.

As with the prior embodiments, cables 532 extending through the ceiling and the cradle 538. These cables 532 ultimately link audio, video and power to the cradle 538 and video system 512. More specifically, the cradle 538 and video system 512 are electrically connected to the remainder of the automobile 511 via electrical communication lines in a manner know to those skilled in the art.

As discussed above, specific wiring arrangements and linking of various video systems within an automobile in accordance with preferred embodiments of the present invention are disclosed in commonly owned patent applications that ate incorporated herein by reference.

The present video system 512 is provided with the ability to offer a variety of functionalities. These functionalities may be hardwired or programmed within the video system 512 or the functionalities may be added in a modular manner via an expansion slot 540 provided within the video system 512. Contemplated functionalities include, but are not limited to satellite radio (for example, Serius, XM), Pictel phone, satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc.

In addition, and in accordance with a preferred embodiment, a broadcast television receiver and an antenna as discussed above with reference to the prior embodiment shown in FIG. 2 is integrated with the video system 512. The video system may also be provided with a flashlight 535 controlled by an on/off switch 535*a*, which runs off a battery (not shown) mounted within the video system 512. The video system 512 may further be provided with both a 110 A power outlet 537*a* and a 12 V power outlet 537*b* for connection with other electronic devices requiring power.

Control of the video system 512, including the video monitor 516, DVD player 520, hard drive 523 and other components of the video system 512, is facilitated by the provision of control buttons along the outer surface of the video system 512. In accordance with a preferred embodiment of the present invention, the control buttons take the form of a multifunction controller 560 permitting movement of a cursor shown upon various interfaces displayed upon the video. In addition, conventional control buttons 562 may also be provided for control of traditional functions. In addition to the provision of manual control buttons, the video system 512 may further include a remote control (not shown) such that an individual need not actually touch the video system 512 to control the video content or the volume generated by the video system 512.

Figure 12:
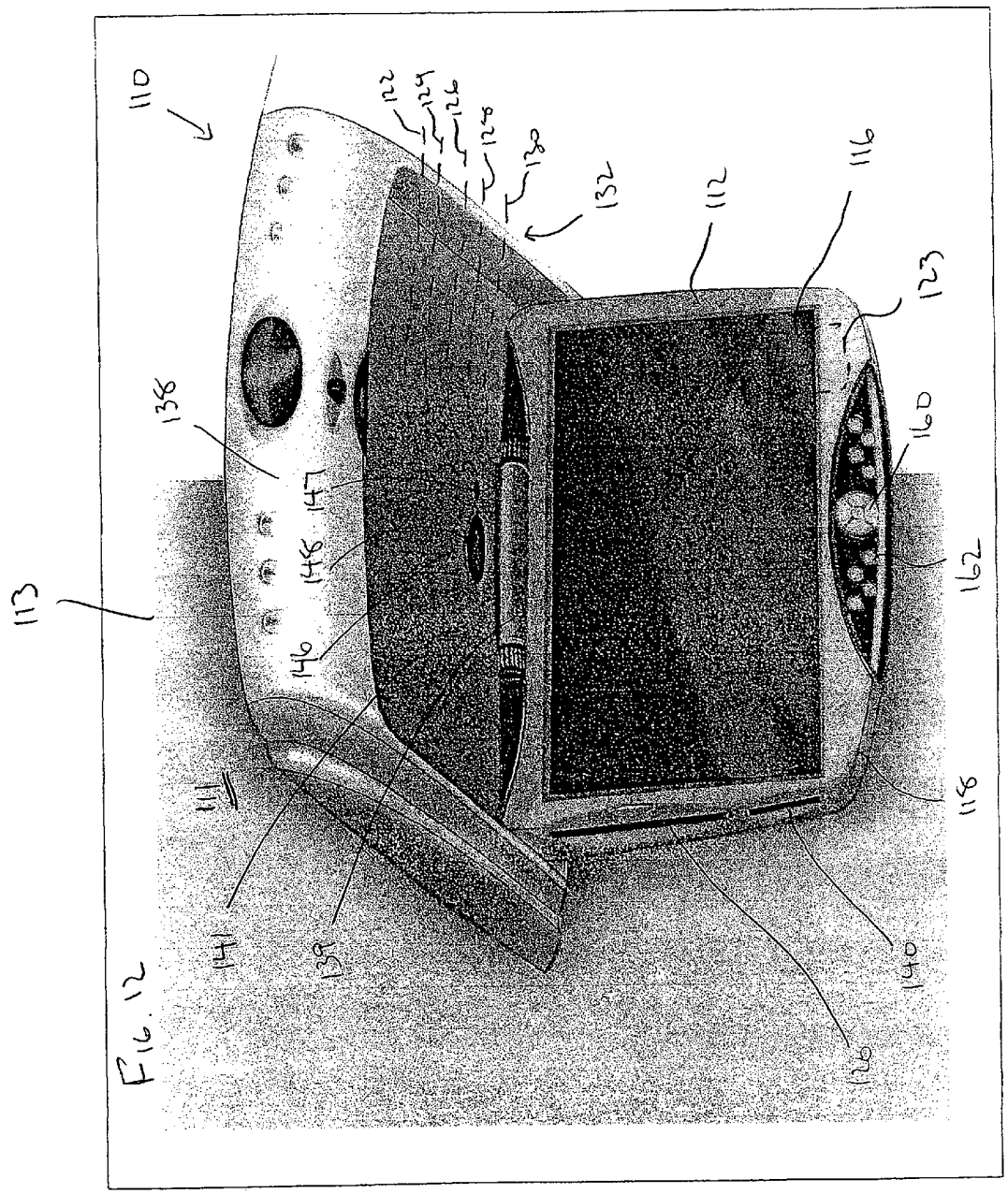
FIG. 12 is a front view of an automobile entertainment system in accordance with an alternate embodiment of the present invention.
Figure 13:
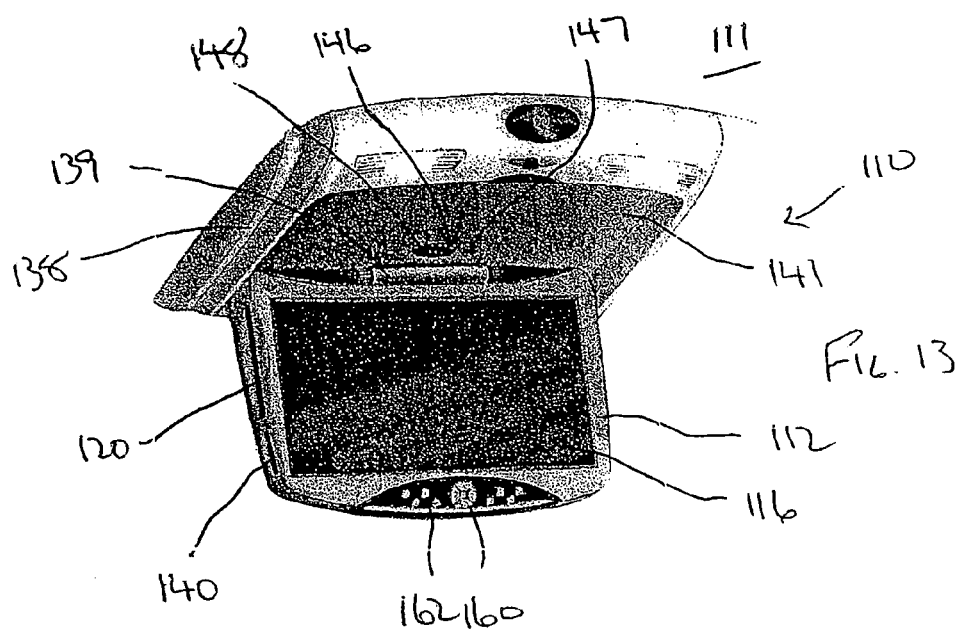
FIGS. 13 and 14 are front perspective views showing the entertainment system of FIG. 12 with the video system coupled to the cradle and detached from the cradle.
Figure 14:
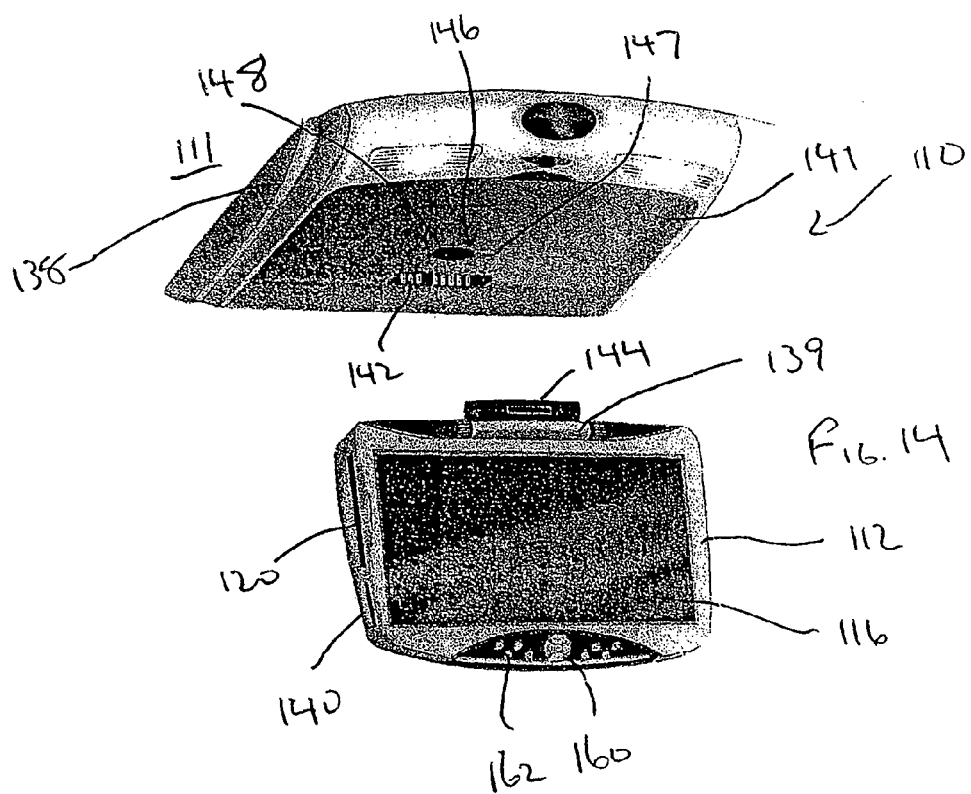

As briefly mentioned above, the present video system 112 (although only the video system disclosed with reference to FIGS. 12-14 is used in describing the various docking stations, the other video systems described with reference to FIGS. 18-27 could also be employed with the docking stations discussed below) is adapted for removal from the ceiling cradle 138 of an automobile 111 for use at a variety of other locations. In accordance with a preferred embodiment of the present invention, the other locations are provided with docking stations 150', 150", 150''' including auxiliary cradles 138', 138", 138''' shaped and dimensioned for receiving the video system 112 and coupling the video system 112 to power sources and a/v sources in a manner similar to the cradle 138 used in conjunction with the ceiling.

Figure 15:
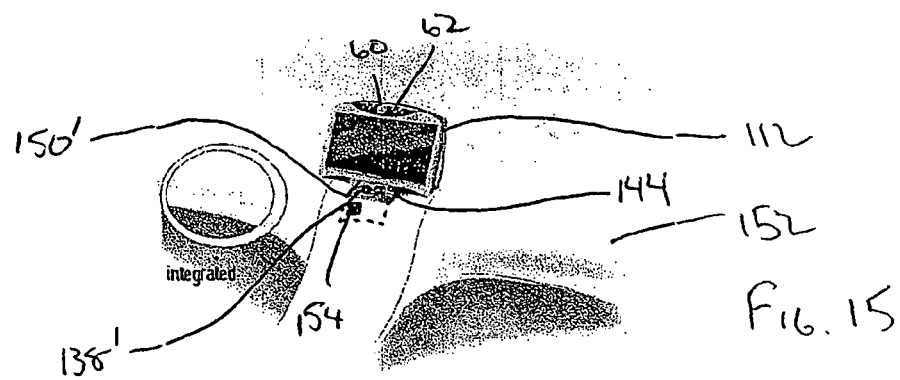
FIG. 15 shows the video system of FIG. 12 mounted within a dash docking station.

For example, and with reference to FIG. 15, a docking station 150' for use in conjunction with the dash 152 of a conventional automobile 111. The docking station 150' includes an auxiliary cradle 138' (with electrical connections and a connecting mechanism (not shown)) shaped and dimensioned for receiving and securely holding the video system 112 and coupling the video system 112 to power sources and a/v sources in a manner similar to the cradle 138 used in conjunction with the headrest 114. The docking station 150' is mounted upon the dash 152 of an automobile 111 and is wired for connection to a power source and a/v sources. In addition, the dash docking station 150' may include an integrated satellite receiver 154' for providing satellite content to the passengers of the automobile 111 by transmitting the satellite signal through the cradle 138' and into the video system 112 via the respective electrical connections of the cradle 138' and the video system 112. This embodiment is particularly useful where the video system 112 includes functionality relating to the provision of GPS guidance information. With this in mind, the driver will be able to selectively use the video system 112 for accessing guidance information when needed and return the video system 112 to the ceiling cradle 138 when guidance information is no longer needed.

Figure 16:
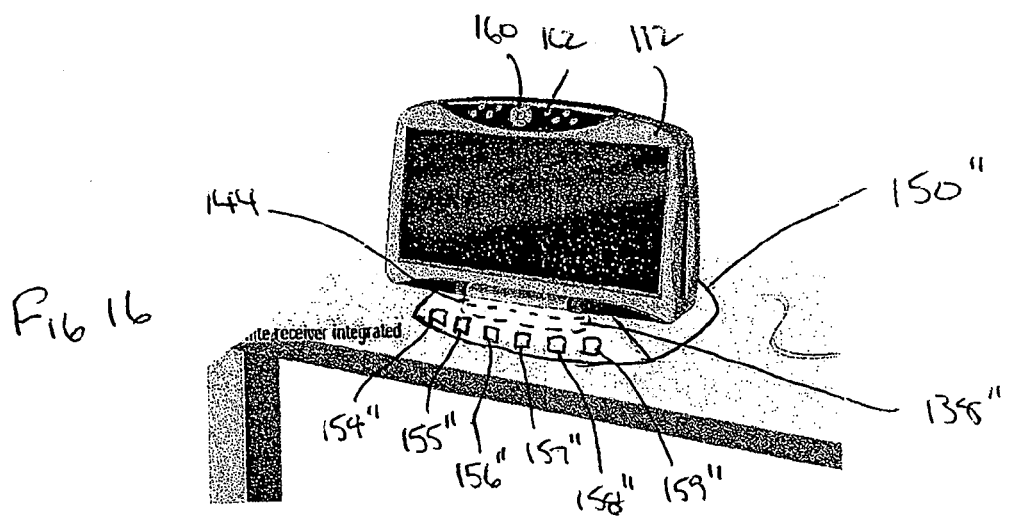
FIG. 16 shows the video system of FIG. 12 mounted within a mobile docking station.

With reference to FIG. 16, a mobile docking station 150" may also be provided. The mobile docking station 150" also includes an auxiliary cradle 138" (with electrical connections and a connecting mechanism (not shown)) shaped and dimensioned for receiving and securely supporting the video system 112 and coupling the video system 112 to power sources and a/v sources in a manner similar to the cradle 138 used in conjunction with the ceiling. The docking station 150" may include a battery pack 155", a/v inputs 156", a/v outputs 157", internet capability, speakers 158", cable input 159" and/or an integrated satellite receiver 154". These components are linked to the video system 112 via the cradle 138" which transmits the relevant signals to and from the video system 112 via the respective electrical connections of the cradle 138" and the video system 112.

As shown in FIGS. 15 and 16, when the video system 112 is mounted to the docking stations 150', 150", it may be necessary to mount the video system 112 upside down when compared to its mounting within an automobile 111. With this in mind, the video system 112 is provided with the ability to rotate to the image shown on the video monitor 116 so that the video system 112 may be used in a variety of orientation. The possible rotation of the image shown on the video monitor 116 is complimented by the multifunctional controller 160 that adjusts to rotation of the image such that the controller 160 is calibrated to function in accordance with the orientation of the screen image.

Figure 17:
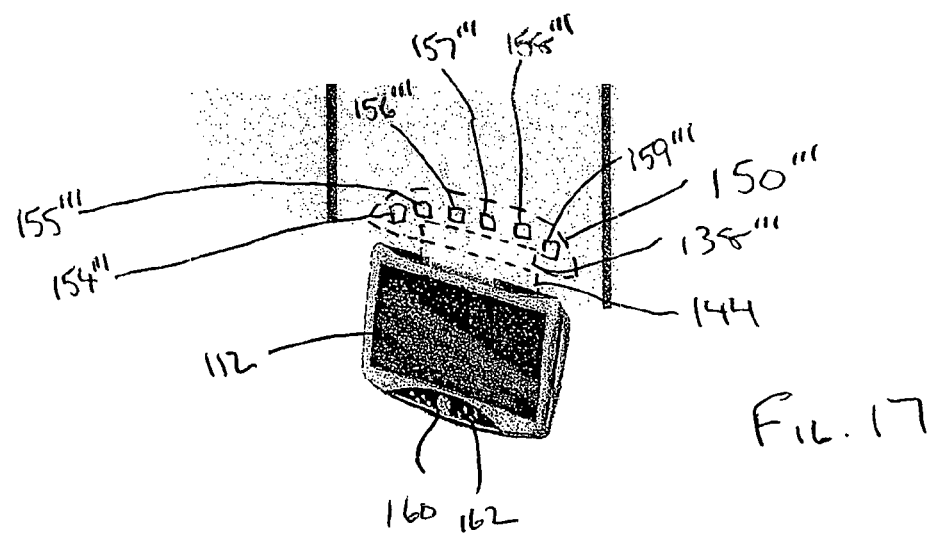
FIG. 17 shows the video system of FIG. 12 mounted within a static docking station.
Figure 18:
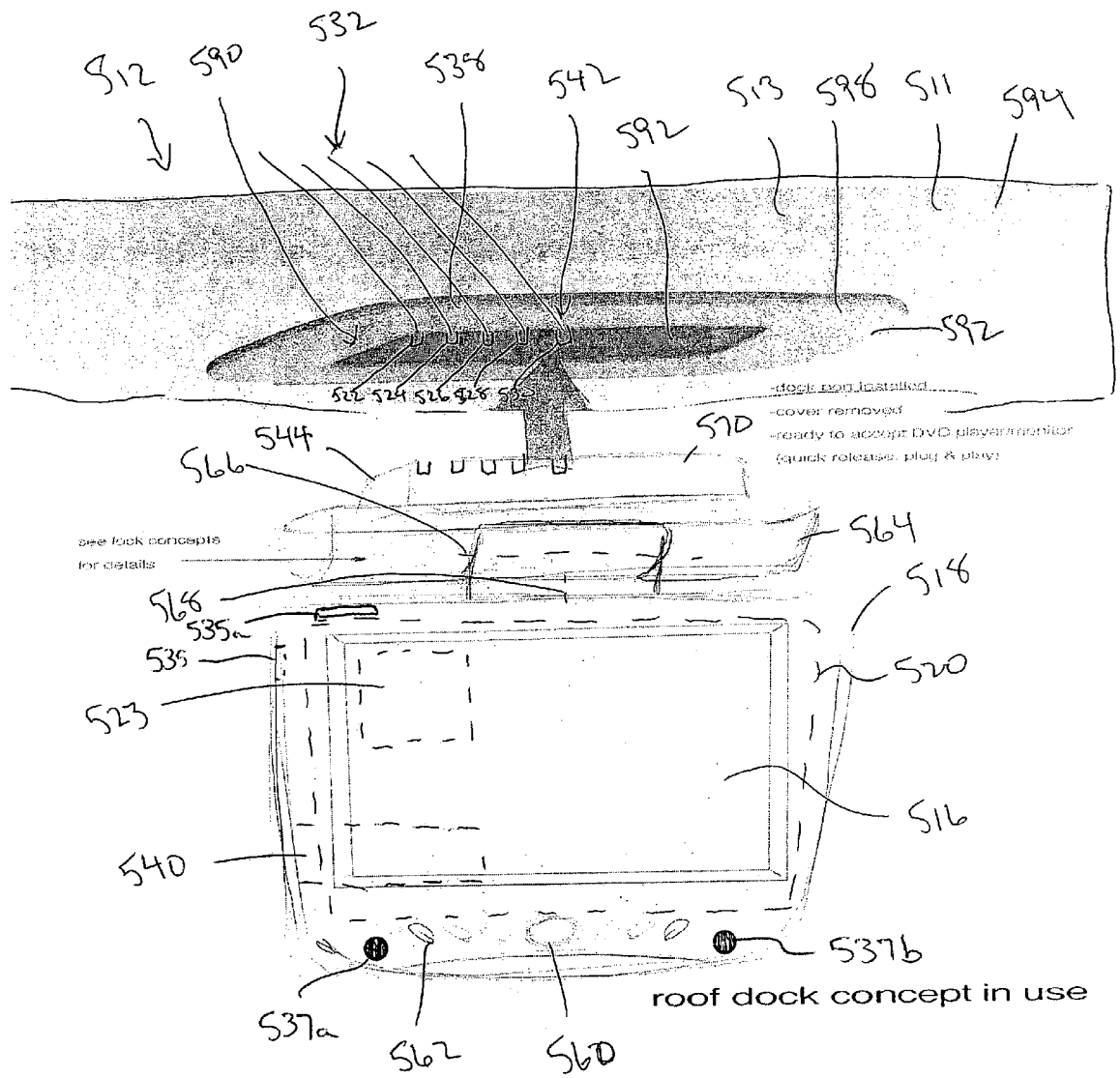
FIG. 18 is a perspective view of a further embodiment of the video system and cradle.
Figure 19:
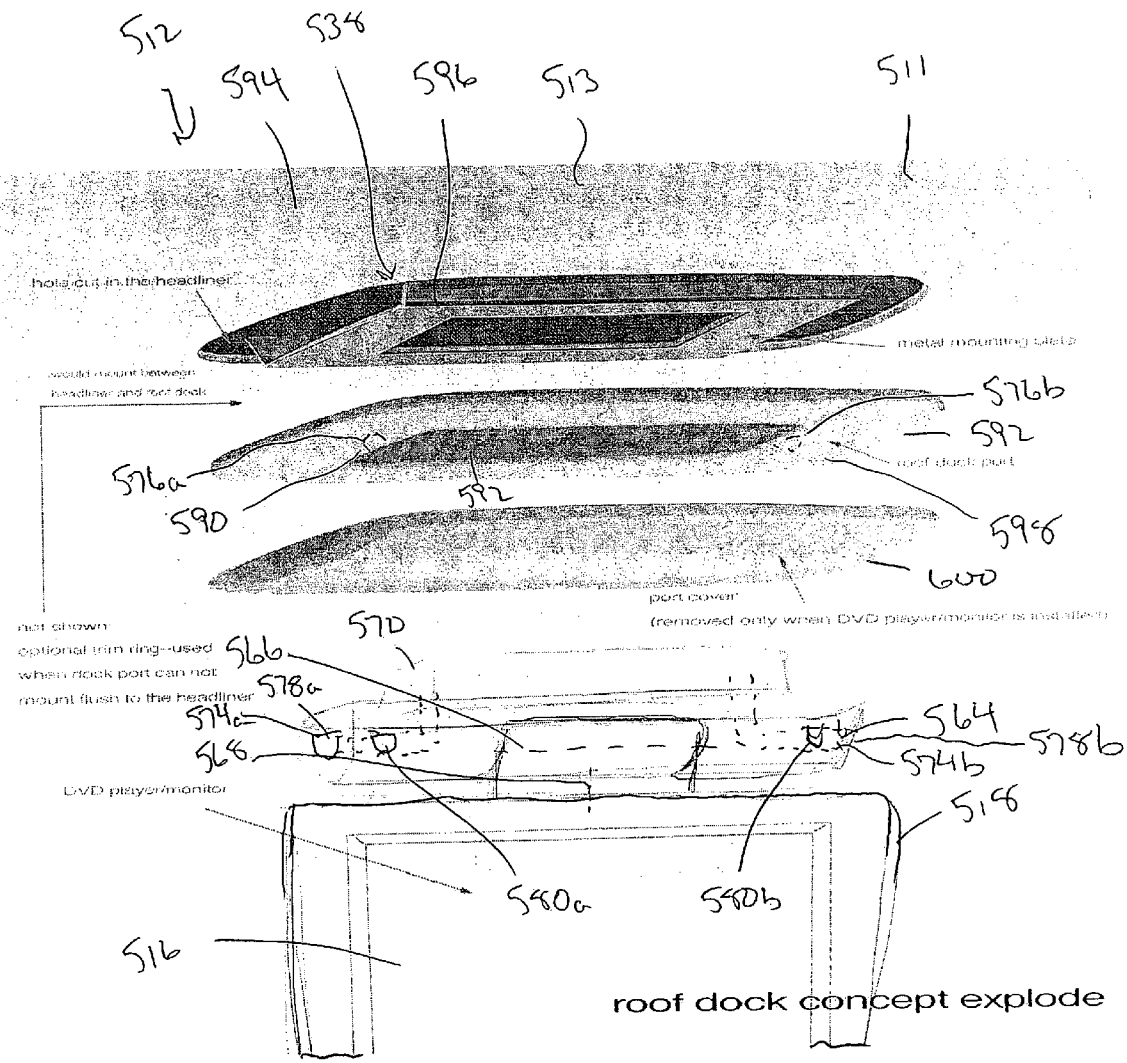
FIG. 19 is an exploded view of the video system and cradle disclosed in FIG. 18.
Figure 20:
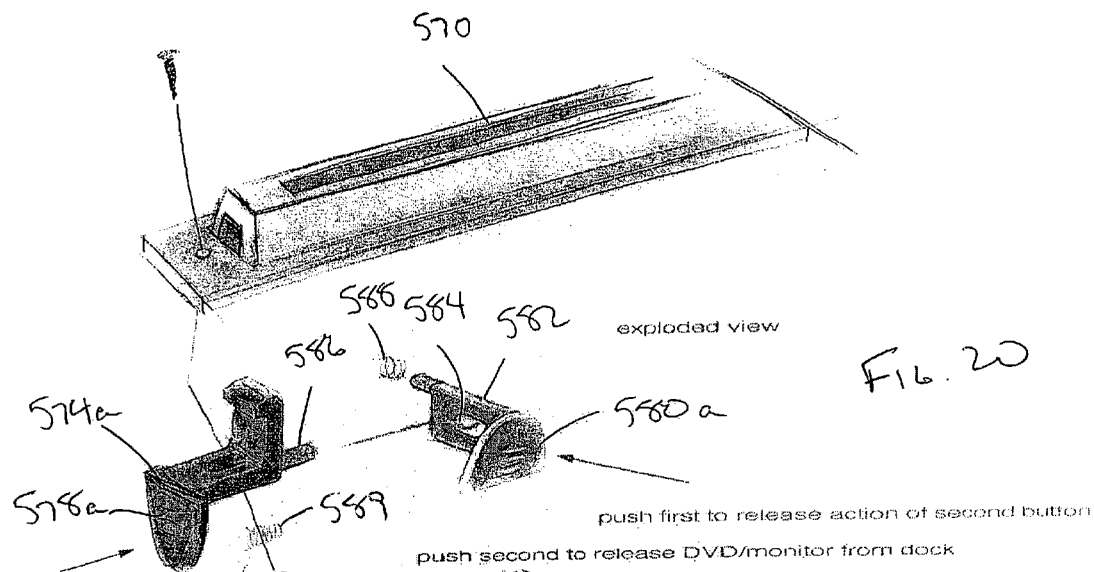
FIG. 20 is an exploded view of the projecting attachment member.
Figure 21:
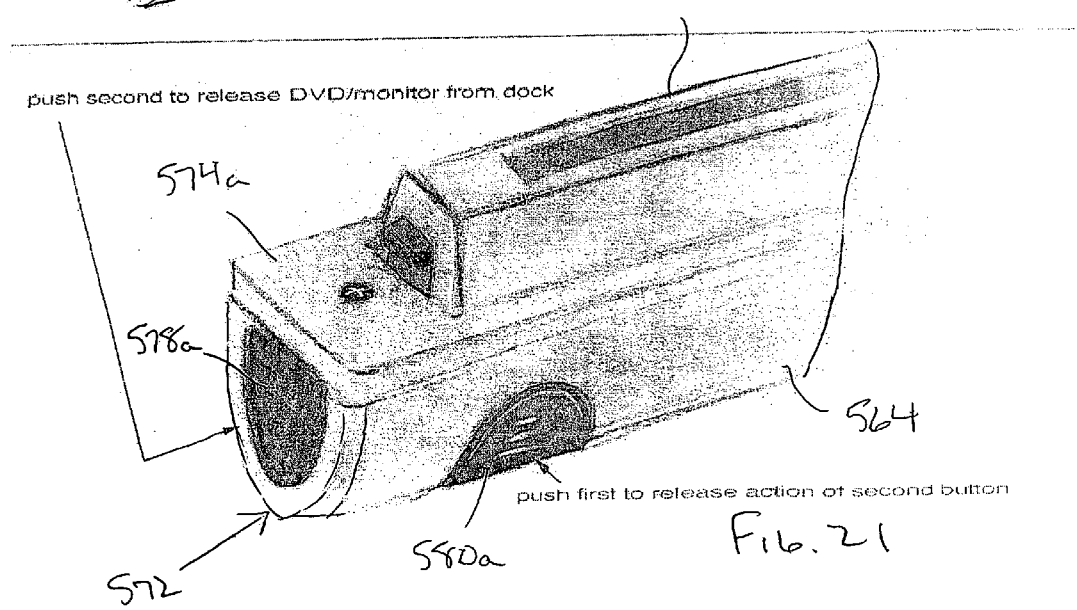
FIG. 21 is a perspective view of the projecting attachment member.

With reference to FIG. 17, yet a further embodiment of a docking station 150''' is disclosed. This docking station 150''' is adapted for static mounting within a household, office or other locations (for example, beneath a kitchen cabinet 153). The docking station 150''' includes an auxiliary cradle 138''' (with electrical connections and a connecting mechanism (not shown)) shaped and dimensioned for receiving and securely supporting the video system 112 and coupling the video system 112 to power sources and a/v sources in a manner similar to the cradle 138 used in conjunction with the ceiling. The docking station 150''' may include a battery pack 155''', a/v inputs 156''', a/v outputs 157''', Internet capability, speakers 158''', cable input 159''' and/or an integrated satellite receiver 154'''. These components are linked to the video system 112 via the cradle 138''' which transmits the relevant signals to and from the video system 112 via the respective electrical connections of the cradle 138''' and the video system 112.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A vehicle entertainment system, comprising:
a video system including a video monitor;
a cradle secured within a ceiling of a vehicle, the cradle being shaped and dimensioned for selectively receiving and securely holding the video system, the cradle includes a docking port with a face plate that is substantially flush with a headliner of the vehicle; and
a cover for covering the cradle when not in use wherein the cover includes a light.

2. The entertainment system according to claim 1, wherein the video system includes a video source, and the video source is a DVD player or hard drive.

3. The entertainment system according to claim 1, wherein the video system includes electrical connectors shaped and dimensioned for selective engagement with electrical connectors formed within the cradle.

4. The entertainment system according to claim 1, wherein the cradle includes a primary recess into which the video system is mounted.

5. The entertainment system according to claim 4, wherein the video system includes a release latch and a safety button preventing inadvertent actuation of the release latch.

6. The entertainment system according to claim 1, further including at least one docking station to which the video system may be selectively secured when not coupled to the cradle.

7. The entertainment system according to claim 6, wherein the video system includes electrical connectors shaped and dimensioned for selective engagement with electrical connectors formed within the docking station.

8. The entertainment system according to claim 1, wherein the video system includes a base selectively secured to the cradle, and the base includes a means for pivoting the video monitor.

9. The entertainment system according to claim 8, wherein the base includes means for pivoting the video monitor about multiple axes.

10. A vehicle entertainment system, comprising:
a video system including a video monitor;
a cradle secured within a ceiling of a vehicle, the cradle being shaped and dimensioned for selectively receiving and securely holding the video system, the cradle includes a docking port with a face plate that is substantially flush with a headliner of the vehicle; and
a cover for covering the cradle when not in use wherein the cover includes a power source.

11. The entertainment system according to claim 10, wherein the video system includes a video source, and the video source is a DVD player or hard drive.

12. The entertainment system according to claim 10, wherein the video system includes electrical connectors shaped and dimensioned for selective engagement with electrical connectors formed within the cradle.

13. The entertainment system according to claim 10, wherein the cradle includes a primary recess into which the video system is mounted.

14. The entertainment system according to claim 13, wherein the video system includes a release latch and a safety button preventing inadvertent actuation of the release latch.

15. The entertainment system according to claim 10, further including at least one docking station to which the video system may be selectively secured when not coupled to the cradle.

16. The entertainment system according to claim 15, wherein the video system includes electrical connectors shaped and dimensioned for selective engagement with electrical connectors formed within the docking station.

17. The entertainment system according to claim 10, wherein the video system includes a base selectively secured to the cradle, and the base includes a means for pivoting the video monitor.

18. The entertainment system according to claim 17, wherein the base includes means for pivoting the video monitor about multiple axes.

* * * * *